Nov. 24, 1953
H. ANDRÉ
2,660,695
LOW VOLTAGE ELECTROCHEMICAL CONDENSER
OF HIGH SPECIFIC GRAVITY
Filed Sept. 2, 1950
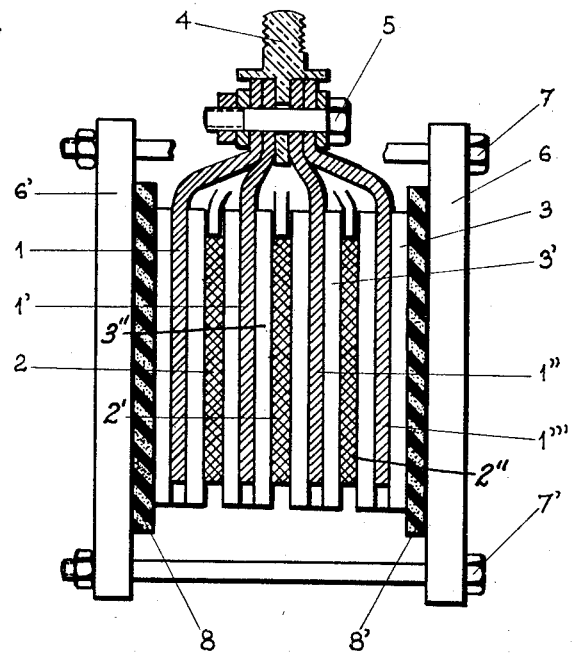
Fig:1
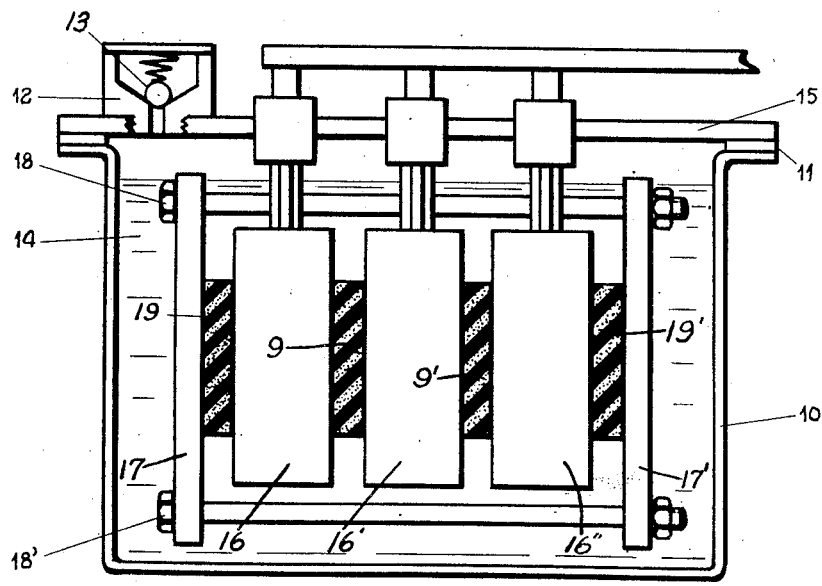
Fig:2
INVENTOR
HENRI ANDRÉ
By:
Haseltine, Lake & Co.
AGENTS Patented Nov. 24, 1953

2,660,695

UNITED STATES PATENT OFFICE 2,660,695

LOW VOLTAGE ELECTROCHEMICAL CONDENSER OF HIGH SPECIFIC GRAVITY

Henri André, Montmorency, France, assignor to La Soudure Electrique Languepin, a corporation of France Application September 2, 1950, Serial No. 182,945

Claims priority, application France September 20, 1949

5 Claims. (Cl. 317—230)

In French Patent 954,003 for: Electro-Chemical Condenser of Very High Specific Capacity, there was described a polarised electro-chemical condenser, comprised of a silver anode and a cathode capable of fixing the negative potential at a constant value, such as zinc, tin, cadmium, etc.

The said patent also indicated the utilisation of a cellulosic separator, the function of which was to maintain the electrodes at a distance and to allow between them the circulation of the electrolyte.

The experimentation of this type of condenser or capacitor revealed that it presented, despite its high capacity, certain defects that rendered its utilisation doubtful, and reduced its life.

In the first case, the use of a soluble cathode such as zinc, which allows the obtaining of a maximum capacity imparts a considerable functioning instability to the apparatus.

By dissolution of the zinc, the electrolyte becomes saline: there is formed in an alkaline medium a zincate the negative temperature coefficient of which is higher than that of caustic potash or soda, and the resistance coefficient of which becomes several times that of the original alkali.

When the capacitor heats, the value of the discharge current increases in a relation that easily reaches 1 to 3, and even more.

By substituting for the soluble negative metal an insoluble cathode, there is formed an hydrate $M(OH)^2$ of very slight adherence, which is weakened by the eventual omission of hydrogen during a rapid charge.

The object of the present invention is the embodiment of an electro-chemical condenser or capacitor of the kind heretofore described that is to say with an insoluble cathode but with the adjunction of means for limiting the gaseous omission and maintaining mechanically the active layer of metallic hydrate.

One of said means consists of the application and maintenance of a considerable pressure of the two electrodes against their separator, due to which the gases resulting from an overvoltage charge are retained mechanically and cannot escape.

This constraint results in the following advantages:

(1) Increase of the accumulable energy by raising of the charge and discharge voltage as well as by the quantity of electricity admitted by the gases under pressure.

(2) Regularity of functioning due to the absence of free gas between the electrodes.

(3) Practical insensitivity of the apparatus to heating, which results in an increase of short circuit current of only 5% between the beginning of the discharges, when cold, and the permanent rate.

The present invention also has for object several constructive arrangements for the application of said means, and in a general manner all condensers or capacitors of the kind in question comprising the improvements or arrangements described heretofore.

The present invention will be better understood by means of the attached figures and the relative description, which relate to a particular and non-limitative embodiment of the invention.

According to this embodiment the capacitor comprises a thin silver anode, the surface suitably enlarged by chemical action, enveloped by 5 to 6 turns of leaf cellophane of 0.03 to 0.05 millimeters thick.

The cathode is for preference of iron or cadmium, or better still of cadmium plate sheet iron. In these conditions, it is unnecessary to solder connecting part or tail to each electrode, as in the case with zinc which risks being broken at the outgoing of the electrolyte, at contact with the air. The iron or cadmium electrode can be cut in one piece with its connecting part.

There is formed a network of two groups of anode and cathode plates, and said network is maintained at each side by two rigid tightening armatures, for example in steel. Between the active element and the two armatures are placed two insulating plates, of ebonite or any other substance resistant to strong alkalis.

Assembling bolts arranged around the active elements afford a strong tightening and a powerful compression of the electrodes.

Before tightening, the apparatus is completely loosened in order to impregnate the cellophane utilised for the separation of the electrodes. The whole assembly is immersed in a solution of caustic potash at 25/30% KOH during about 24 hours taking care to prevent the potash being in contact with the air in order to prevent its carbonatation.

The armatures are then tightened by means of nuts and bolts and the active element is then placed in the container.

The container is provided with a watertight cover which comprises a protective valve against the air and allows the liberation of internal gas which may occur during intensive functioning. Said valve may be mounted on the refilling stopper. The active element is completely immersed by the electrolyte of which one of the essential functions is to regularise the internal temperature of the apparatus.

Figure 1 shows a cross section of a group of electrodes for condenser comprising the arrangements heretofore described.

There is shown anodes 1 1', 1'' 1''', made of thin silver blades, enveloped in layers of cellophane 3, 3', 3'', cathodes 2, 2', 2'', preferably made of sheet iron cadmiumed, the connecting parts of which are brought together on a terminal by means of a nut and bolt in a plane outside the figure plane, in the same manner, as the connecting parts of the anodes are brought together on terminal 4, by means of nut and bolt 5.

Steel plates 6, 6' are assembled by nuts and bolts 7, 7'. Between said plates and the active element are inserted two insulation plates 8, 8', in flexible ebonite for example, which, to a certain extent regularize the pressure. Said plates 8, 8', ensure an electrical separation from the container and permit of effecting separate measures of potentials to the electrodes.

Figure 2 shows the assembling of several cells, i. e. of groups or sets of electrodes 16, 16', 16'' and separatus of the kind heretofore described, in parallel, in a same container. In this case, the spacing elements or plates 9, 9', allow the spacing of said groups in a manner to keep the circulation of electrolyte 14, assuring the necessary cooling.

A compressing device of the whole of the groups is composed of compressing plates 17, 17', and nuts and bolts such as 18, 18', with interposition of insulating elements 19, 19'.

The container 10 comprises an assembled cover 15 and a joint 11 which assures water tightness. The cover may be soldered or welded, said cover and container being in preference made of steel. Stopper 12 is provided with valve 13 which may be composed of a simple glass or steel ball.

The present invention is capable of several variations in the field of the general arrangements heretofore described. For example the device for tightening the electrodes and the separating elements by rigid plates and nuts and bolts, maybe replaced by other devices with strapping or tightening means. The compression of the electrodes and the separating elements may also be assured by the walls of the container adapted therefor and into which the whole of the groups is inserted by force.

What I claim is:

1. In an instantaneous discharge electro-chemical condenser comprising a tank containing an alkaline electrolyte, a film-like silver anode, a film-like cathode, made of a metal selected from the group consisting of zinc, tin, cadmium, iron and cadmium-plated sheet iron, and a film-like cellulosic interelectrode separator, the provision of means independent of the tank for mechanically compressing said separator between said electrodes with sufficient pressure for substantially preventing the escape of gaseous discharge.

2. An electro-chemical condenser according to claim 1, in which said means comprise two compressing plates placed one on each side of the set of electrodes and separator and connected together by tie rods constructed and arranged to compress said set between said two plates with the desired pressure.

3. An electro-chemical condenser according to claim 2 including insulating plates respectively interposed between said two compressing plates and the end faces of the set of electrodes and separator.

4. An electro-chemical condenser according to claim 1 comprising a container so dimensioned that two opposite sides thereof compress the set of the electrodes and separator with the desired pressure.

5. An electro-chemical condenser according to claim 1, comprising a plurality of cells each comprising a set of electrodes and separator mounted in the same tank, said sets being placed side by side with an insulator interposed between the two consecutive sets, the said compressing means being common for all said sets.

HENRI ANDRÉ.

References Cited in the file of this patent
UNITED STATES PATENTS

| Number | Name | Date |
|---|---|---|
| 1,267,613 | Whitney | May 28, 1918 |
| 1,587,942 | Dubilier | June 8, 1926 |
| 1,798,287 | Ward | Mar. 31, 1931 |
| 1,845,067 | Weaver | Feb. 16, 1932 |
| 1,866,604 | Siegmund | July 12, 1932 |
| 1,973,694 | Briggs | Sept. 18, 1934 |
| 2,062,464 | Lilienfeld | Dec. 1, 1936 |
| 2,088,949 | Fekete | Aug. 3, 1937 |
| 2,125,373 | Georgiev | Aug. 2, 1938 |